Patented Jan. 31, 1939

2,145,417

UNITED STATES PATENT OFFICE 2,145,417

STABILIZED NITRITE SALT COMPOSITION

Lloyd A. Hall, Chicago, Ill., assignor to The Griffith Laboratories, Inc., Chicago, Ill., a corporation of Illinois No Drawing. Application June 5, 1936,
Serial No. 83,703

13 Claims. (Cl. 99—222)

The present invention relates to the manufacture of a salt composition containing nitrite, and has for its object the formation of a noncaking composition which is stable in nitrite content, to remain free from nitrous acid.

It is known that a sodium chloride solution containing a nitrite salt of sodium or potassium may be flash dried to form crystals of sodium chloride in which are jacketed heart-like centers of nitrite. It is also known that nitrate of sodium or potassium may also be present, in which case the nitrite and nitrate are present together as the heart-like center. The process may be carried out by spray-drying particles of the solution, or by evaporating a thin film of the solution on hot rolls, such as from 140° C. to 160° C. or more. The resulting powdery mass is crystalline under the microscope. It has been determined that these minute crystals contain a small quantity of water which is gradually released on aging the crystals. The release of water results in the powder mass forming a hard cake.

In order to avoid the caking it has heretofore been proposed to add a suitable hygroscopic substance so that it takes up the water and forms a liquid partition or lubricating film in the intercrystal space or on the crystals themselves. Where corn sugar has been used for such purpose it has been found that an acid condition gradually develops. The acid reaches some of the nitrite salt and sets free nitrous acid. The mass then exhibits the odor of nitrous acid. If the mass is so exposed as to permit loss of this nitrous acid, there is a gradual reduction in nitrite content.

In making a salt composition by the flash drying process, it has heretofore been proposed to add various colloidal agents as binders. These are largely organic substances and in many cases they may gradually produce acidity of limited character. These binding agents and hygroscopic agents may therefore subject a composition containing nitrite to a gradual decomposition, by action of acid on nitrite. This may amount to a loss of ½% nitrite strength in two months time.

The uses of salts to which the invention applies are such that it is desirable to maintain a fixed nitrite analysis for commercial reasons. Likewise, it is desirable to avoid the acid condition, and particularly the generation of nitrous vapors. Salts containing nitrite without nitrate are suitable for diazotization reactions. Where a stable nitrite content is maintained, a measured quantity of nitrite may be readily weighed out, and added gradually to diazotization baths. The very fact that the nitrite is housed in a jacket of sodium chloride permits use of solid salt in preference to nitrite solutions, without loss of nitrite value upon addition to acidified diazotization baths, as may readily occur if commercial nitrite salt is used.

The same salt may also be used in a nitrite cure of meats, blood and the like. Where nitrate is also present, the triple salt particle may be used in the meat-curing art. It is essential in this field that curing salts be stable and standardized, in order to meet governmental regulations, and in order to permit constant results with fixed formulas.

The present invention aims to stabilize the nitrite content by the use of a corrective or inhibitive agent where an acid-producing ingredient is used in the composition, as for example where corn sugar is employed for one or more reasons.

Corn sugar may be mixed with curing salt as a curing ingredient, as for example for hams. It is therefore to be understood that the sole function of corn sugar is not for prevention of caking. Likewise, other things may be used which tend to create acid.

By incorporating a buffer agent into the mass the hydrogen ion concentration of the same may be controlled so as to render the nitrite content stable, and free from change to volatile nitrous acid. The preferred manner of doing this is to use a buffer salt which is soluble and to incorporate it into the sodium chloride solution in which the nitrite and/or nitrate is dissolved. Thus, the buffer agent is also subjected to the flash drying process, and it becomes more fixedly incorporated into the mass and more intimately associated with the nitrite content.

A number of buffer agents are available for use, and more latitude of choice is permitted for chemical usage than for meat-curing salts. For the latter field disodium phosphate, sodium carbonate or sodium bicarbonate are satisfactory.

In carrying out the flash-drying process, the character of the product depends upon the proportion of sodium chloride present. Where about 80% or more of sodium chloride is used to 20% or less of nitrite and/or nitrate, substantially all of the nitrogen carrying salts are housed inside of sodium chloride jackets. Where the nitrogen salt content becomes larger, some of this cannot be so jacketed by sodium chloride. Such compositions are more subject to loss of nitrite value than the completely jacketed nitrite compositions.

Therefore, the preferred form of the invention involves the compositions wherein there is about 10% or more of sodium chloride to 20% or less of nitrogen salt. The preferred practice of the invention contemplates addition of the buffer salt to the sodium chloride solution. However, it may be added to the product of flash-drying, in which case it is only in mechanical admixture therewith, as distinguished from physical incorporation.

Experiments have been carried out from which it has been determined that when the composition exhibits a pH value of 6.5 or even of 6.9, the nitrite is converted into nitrous acid. The composition must have a pH value of not under 7.4 to assure its stability as to nitrite content. Of course it is not desirable to make the product highly alkaline, or to provide any substantial reserve of acid-neutralizing (alkali) content. It is however necessary to add some material which will keep the pH value not under pH 7.4. This may function to neutralize acid as it is formed, or it may function to prevent generation of acid.

Where the acid is generated from the presence of corn sugar, it is not known exactly by what mechanism the acid is formed, nor is it material. It is known that where disodium phosphate, or sodium carbonate, or sodium bicarbonate is present, in small amount, such as ¼ as much as the corn sugar, the acid condition is never detected and the nitrite content is stable. For example, a composition having 12% nitrite, no corrective agent according to this invention, and from about 0.55% to 1.1% of corn sugar, may show a loss of ½% in nitrite value in 60 days. This loss may be averted by use of .1% to .3% of sodium bicarbonate, or its equivalent buffer salt. The corrected composition does not change at all in six months or over. Only a sufficient amount is required to avoid a pH value under 7.4. For safety, a pH value of 7.7 to 7.9 is preferred. This may be determined in the solution before flash-drying, or in a solution of the product after it is formed by flash-drying or by mechanical mixing.

Example I

| | Parts |
|---|---|
| Sodium chloride | 2108 |
| Sodium nitrite | 321 |
| Sodium nitrate | 216 |
| Corn sugar | 20 |
| Sodium bicarbonate | 5 |

The above solution is sprayed or splashed onto rotating rolls heated at about 160° C. more or less. A fine powder is formed, which is stable in nitrite content.

Example II

| | Parts |
|---|---|
| Sodium chloride | 450 |
| Sodium nitrite | 50 |
| Corn sugar | 4 |
| Glycerol | 3 |
| Sodium carbonate (or disodium phosphate) | 1 |

The above composition forms a 10% sodium nitrite mass, which is non-caking and stable in nitrite value, and well adapted as a 10% nitrite body, to be used in diazotizations. A strong solution of the ingredients may be flash-dried. The sodium chloride and nitrite may be flash-dried, and the other ingredients may be mixed into the resulting powder before the water in the crystals is released by aging.

It is not necessary that the acid-producing ingredient be present in combinations according to this invention. This will be readily appreciated in the meat-curing art, where the strong nitrite sodium chloride mass may be diluted with salt or sugar or both, in compounding curing compositions for stocks to be used with various formulas. For instance, corn sugar may be used as a diluent to serve as a sweetening agent in a ham cure. A mass so diluted may generate acid, and if the original nitrite-sodium chloride mass is not protected by the buffer agent, the sweetened mass may deteriorate in nitrite, and develop nitrous vapors.

Those skilled in the art will appreciate the various modifications and variations in the invention which fall within the scope of the appended claims.

I claim:

1. A solid salt composition comprising sodium chloride crystals in the form of jackets housing nitrite salt of alkali metal, additional material of a nature likely to produce an acid condition, and a small quantity of buffer salt to maintain the pH value over pH 7.4, whereby the nitrite content is stabilized as such against conversion to nitrous acid.

2. A solid salt composition comprising sodium chloride crystals in the form of jackets housing nitrite salt of alkali metal, corn sugar as an ingredient existing between the sodium chloride crystals and likely to produce an acid condition, and a small quantity of buffer salt to maintain the pH value over pH 7.4, whereby the nitrite content is stabilized as such against conversion to nitrous acid.

3. A solid salt composition comprising sodium chloride crystals in the form of jackets housing nitrite salt and nitrate salt of alkali metal, corn sugar as an ingredient existing between the sodium chloride crystals and likely to produce an acid condition, and a small quantity of buffer salt to maintain the pH value over pH 7.4, whereby the nitrite content is stabilized as such against conversion to nitrous acid.

4. A solid salt composition comprising sodium chloride crystals in the form of jackets housing nitrite salt and nitrate salt of alkali metal, corn sugar as an ingredient existing between the sodium chloride crystals and likely to produce an acid condition, and a small quantity of sodium bicarbonate to maintain a pH value not under pH 7.4, whereby the nitrite content is stabilized as such against conversion to nitrous acid.

5. A solid salt composition comprising sodium chloride crystals in the form of jackets housing nitrite salt and nitrate salt of alkali metal, corn sugar as an ingredient existing between the sodium chloride crystals and likely to produce an acid condition, and a small quantity of sodium bicarbonate physically bound up in said sodium chloride jackets to serve as a buffer agent maintaining a pH of not under pH 7.4, whereby the nitrite content is stabilized as such against conversion to nitrous acid.

6. The method of making a stable nitrite salt composition which comprises flash drying a solution of sodium chloride containing a nitrite of alkali metal and a small amount of buffer agent for maintaining the hydrogen ion concentration of the mass at a pH value of not under pH 7.4.

7. The method of making a stable nitrite salt composition which comprises flash drying a solution of sodium chloride containing a nitrite of alkali metal whereby to produce a powdery product in which nitrite is housed in sodium chloride jackets, and thereafter mixing into the powder a small quantity of a buffer agent to maintain the hydrogen ion concentration of the composition at a pH value of not under pH 7.4.

8. A solid salt composition which is stabilized in nitrite content, comprising sodium chloride crystals in the form of jackets housing nitrite salt of alkali metal, said composition including a buffer agent to insure a pH value of not under pH 7.4.

9. A solid salt composition which is stabilized in nitrite content, comprising sodium chloride crystals in the form of jackets housing nitrite salt of alkali metal, said crystals containing also a small quantity of a buffer agent to insure a pH value of not under pH 7.4.

10. A solid salt composition which is stabilized in nitrite content, comprising sodium chloride crystals in the form of jackets housing nitrite salt of alkali metal, and admixed therewith a buffer agent to insure a pH value of not under pH 7.4.

11. A solid salt composition which is stabilized in nitrite content, comprising sodium chloride crystals in the form of jackets housing nitrate and nitrite salt of alkali metal, and admixed therewith a buffer agent to insure a pH value of not under pH 7.4.

12. A solid salt composition which is stabilized in nitrite content, comprising sodium chloride crystals in the form of jackets housing nitrate and nitrite salt of alkali metal, said crystals containing a buffer agent to insure a pH value of not under pH 7.4.

13. A solid salt composition which is stabilized in nitrite content, comprising sodium chloride crystals in the form of jackets housing nitrate and nitrite salt of alkali metal, said composition including a buffer agent to insure a pH value of not under pH 7.4.

LLOYD A. HALL.